2,734,060
Patented Feb. 7, 1956

2,734,060

3'-BENZOYL-4-AMINO-1,9-ANTHRAPYRIDONE-2-SULFONIC ACID

Jacques Günthard, Basel, and Albin Peter, Binningen, near Basel, Switzerland, assignors to Sandoz A. G., Basel, Switzerland, a Swiss firm No Drawing. Application July 1, 1955,
Serial No. 519,656

Claims priority, application Switzerland October 8, 1954

1 Claim. (Cl. 260—278)

The present invention relates to 3'-benzoyl-4-amino-1,9-anthrapyridone-2-sulfonic acid, and to polyacrylonitrile materials dyed therewith.

The said anthrapyridone-sulfonic acid can be prepared, for example, by the reaction between 3'-benzoyl-2-halogen-4-amino-1,9-anthrapyridone and an alkali metal sulfite or, alternatively, by treating a 3'-benzoyl-4-alkylsulfonyl- or -arylsulfonyl-amino-1,9-anthrapyridone-2-sulfonic acid with a hydrolyzing agent. The product in either case is 3'-benzoyl-4-amino-1,9-anthrapyridone-2-sulfonic acid.

This product is characterized more especially by the fact that it dyes wool, silk, synthetic polyamide fibers and, especially polyacrylonitrile fibers in valuable scarlet shades. The dyeings thus obtained are distinguished by excellent fastness to washing and to light.

The first aforementioned process embodiment is advantageously carried out in aqueous medium and at elevated temperature. A temperature in the range of 100–160° C. is preferred. A reaction period of about 10–24 hours is necessary. The preferred alkali metal sulfite is sodium sulfite although potassium sulfite is also excellently suitable for the reaction.

Hydrolysis according to the aforementioned second process embodiment is advantageously carried out at a temperature within the range from 20–40° C. A preferred hydrolyzing agent is concentrated sulfuric acid, sulfuric acid of 90–100% strength being particularly suitable.

The following examples illustrate the invention, although such invention is not intended to be limited thereto. In the examples, except where otherwise noted, the parts and percentages are by weight and the temperatures are in degrees centigrade.

Example 1

100 parts of 3'-benzoyl-4-(4'-methyl)-phenylsulfonyl-amino-1,9-anthrapyridone-2-sulfonic acid are introduced into 300 parts of 95% sulfuric acid at 30°. The mixture is stirred at this temperature until complete dissolution is realized. The starting compound will then have been hydrolyzed to 3'-benzoyl-4-amino-1,9-anthrapyridone-2-sulfonic acid. The reaction mass is then poured into 1500 parts of an aqueous solution of Glauber's salt of 10% strength, and the precipitate which forms is filtered off with suction and is then washed with 10% Glauber's salt solution. Thereupon, the filter cake is taken up in 1000 parts of water. The obtained suspension is rendered alkaline by means of aqueous caustic soda solution, 100 parts of Glauber's salt are added, the thus completely precipitated dyestuff is filtered off with suction, the filter cake is washed with 5% aqueous Glauber's salt solution and dried.

The so-obtained new dyestuff which corresponds to the formula

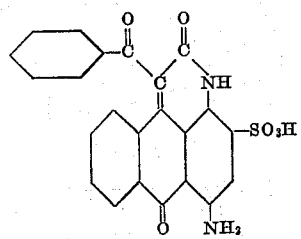

is a red powder which dissolves in water to yield a vivid scarlet coloration. The color of the solution in sulfuric acid is yellow; upon addition of boric acid it turns toward the red, upon addition of formaldehyde it turns towards violet-red. The dyestuff dyes wool, silk, synthetic polyamide fibers and, especially polyacrylonitrile fibers, in scarlet shades which are fast to washing and to light.

The 3'-benzoyl-4-(4'-methyl)-phenylsulfonylamino-1,9-anthrapyridone-2-sulfonic acid, employed as starting compound, is prepared, for example, by reacting the sodium salt of 1-amino-4-(4'-methyl)-phenylsulphonyl-aminoanthraquinone-2-sulfonic acid with benzoylacetic acid ethyl ester at 170° in the presence of phenol, and isolating the resultant condensation product.

Example 2

10 parts of 3'-benzoyl-2-bromo-4-amino-1,9-anthrapyridone are heated, together with 40 parts of a saturated aqueous solution of sodium sulfite, to 140° in an autoclave for 18 hours. Thereupon the reaction mass is taken up in a 5% aqueous Glauber's salt solution, the precipitated dyestuff is filtered off with suction, washed with 5% aqueous Glauber's salt solution and dried.

The so-obtained dyestuff is identical with the product obtained according to Example 1.

3'-benzoyl-2-bromo-4-amino-1,9-anthrapyridone can be obtained, for example, by the action of concentrated sulfuric acid on 3'-benzoyl-2-bromo-4-(4'-methyl)-phenylsulfonylamino-1,9-anthrapyridone.

Example 3

10 parts of 3'-benzoyl-4-phenylsulfonylamino-1,9-anthrapyridone-2-sulfonic acid are stirred in 40 parts of sulfuric acid monohydrate at 20° until a test specimen of the reaction mixture in 1% aqueous sodium carbonate solution shows that the starting product is completely hydrolyzed. The so-obtained dyestuff is worked up after the manner described in Example 1. It is identical with the product there described.

Example 4

10 parts of sodium 3'-benzoyl-4-ethylsulfonylamino-1,9-anthrapyridone-2-sulfonate are dissolved in 60 parts of 95% sulfuric acid, and the mixture is stirred at 35–40° until a chromatographed test specimen thereof indicates completion of the hydrolysis. The reaction mass is then poured into 500 parts of a 10% aqueous Glauber's salt solution at 60°. The dyestuff which precipitates is filtered off, the filter cake is washed with a small quantity of cold water and is converted into paste form with sodium carbonate until a weakly alkaline reaction is achieved. Upon drying, a dyestuff is obtained

Example 5

8 parts of 3'-benzoyl-2-chloro-4-amino-1,9-anthrapyridone and 50 parts of a saturated aqueous sodium sulfite solution are heated to 160° for 20 hours in an autoclave. Thereupon, the sulfonation product is isolated by filtration. The filter cake is dissolved in 200 parts of water, undissolved by-products are filtered off from the solution, and sodium chloride is added to the filtrate to precipitate the dyestuff therefrom. The precipitated dye-stuff is filtered off and dried. It is identical with the product described in Example 1.

The 50 parts of saturated sodium sulfite solution used for the sulfonation can be replaced by 50 parts of saturated aqueous potassium sulfite solution.

Example 6

100 parts of a washed skein of polyacrylonitrile (staple fibers) are introduced at 70° into a dyebath which consists of a solution of 1 part of 3'-benzoyl-4-amino-1,9-anthrapyridone-2-sulfonic acid (in the form of the sodium salt), 1 part of crystalline copper sulfate, 4 parts of concentrated formic acid and 4000 parts of water, and which contains 20 parts of a gauze made of copper wire of 0.2 mm. diameter. The bath is heated to boiling and, after a boiling period of 80 minutes, is completely exhausted, and the textile material is dyed a fast bright scarlet.

Example 7

A printing paste of the following composition:

15 parts of 3'-benzoyl - 4 - amino-1,9-anthrapyridone-2-sulfonic acid (in the form of the lithium salt),
50 parts of thiodiethyleneglycol,
405 parts of hot water,
400 parts of gum thickener (1:2),
60 parts of tartaric acid (1:1),
50 parts of crystalline copper sulfate (1:4),
20 parts of copper bronze 1000 parts is printed onto a fabric of polyacrylonitrile (staple fibers). After drying, the print is steamed for 30 minutes at 104°, after which it is rinsed, cooled and then soaked at 50–60° with a fatty alcohol sulfonate. The product, in which good penetration of the fabric has been realized, is a beautiful scarlet print with very good wet fastness properties.

Having thus disclosed the invention, what is claimed is:

3'-benzoyl-4-amino-1,9-anthrapyridone-2-sulfonic acid.

References Cited in the file of this patent

UNITED STATES PATENTS

| | | |
|---|---|---|
| 1,891,317 | Peter | Dec. 20, 1932 |
| 2,025,921 | Weinand | Dec. 31, 1935 |
| 2,700,589 | Iannarone | Jan. 25, 1955 |